United States Patent [19]
Danube et al.

[11] Patent Number: 5,267,400
[45] Date of Patent: Dec. 7, 1993

[54] SERRATED SHEARS

[75] Inventors: Theodore Danube, Merrimac; David E. Lutzke, Madison, both of Wis.

[73] Assignee: Fiskars Oy Ab, Helsinki, Finland

[21] Appl. No.: 875,250

[22] Filed: Apr. 28, 1992

[51] Int. Cl.⁵ .......................... B26B 13/00; B26B 9/02
[52] U.S. Cl. .......................... 30/250; 30/254; 30/266; 30/355
[58] Field of Search ................. 30/225, 248, 249, 250, 30/251, 252, 253, 254, 266, 355

[56] References Cited

U.S. PATENT DOCUMENTS

| | | | |
|---|---|---|---|
| 617,964 | 1/1899 | Krank | 30/355 |
| 625,896 | 5/1899 | O'Dell | 30/355 |
| 636,473 | 11/1899 | Tuiller | 30/355 |
| 756,818 | 4/1904 | Benton | 30/355 |
| 1,648,984 | 11/1927 | Enell | 30/355 |
| 3,187,430 | 6/1965 | Wallace et al. | 30/266 |
| 3,196,540 | 7/1965 | Porsky | 30/254 |

*Primary Examiner*—Douglas D. Watts
*Assistant Examiner*—Paul M. Heyrana, Sr.
*Attorney, Agent, or Firm*—Foley & Lardner

[57] ABSTRACT

A compound action shears having a pair of blades interconnected for reciprocation between open and closed positions, one of the blades having a serrated edge with the inner surface of the blade being beveled to provide a curved surface rearwardly of the serrated edge, and the other blade having a cutting edge positioned to engage the beveled surface rearwardly of the serrated edge.

3 Claims, 2 Drawing Sheets

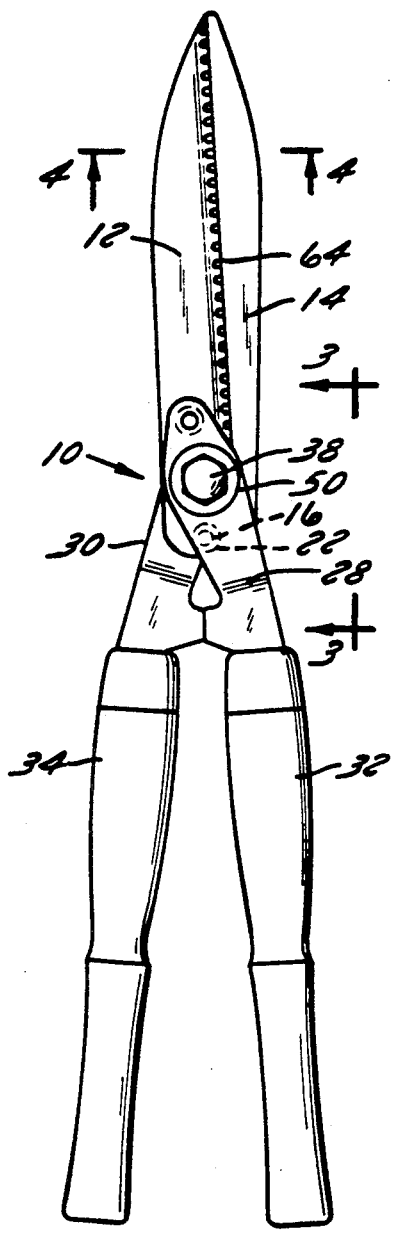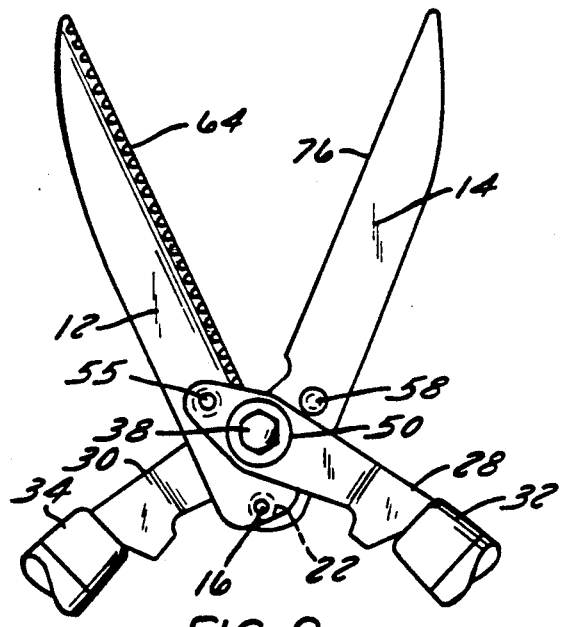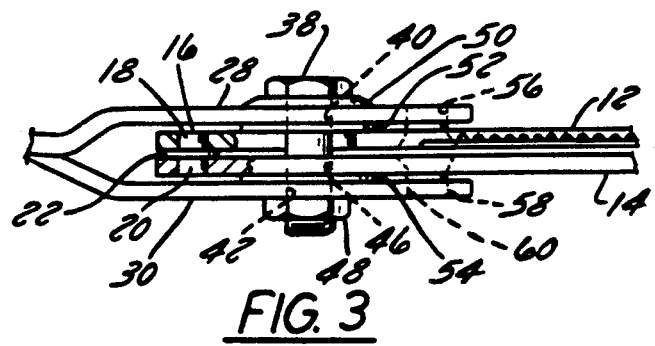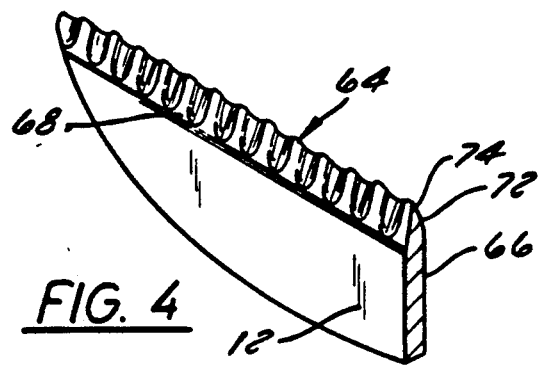

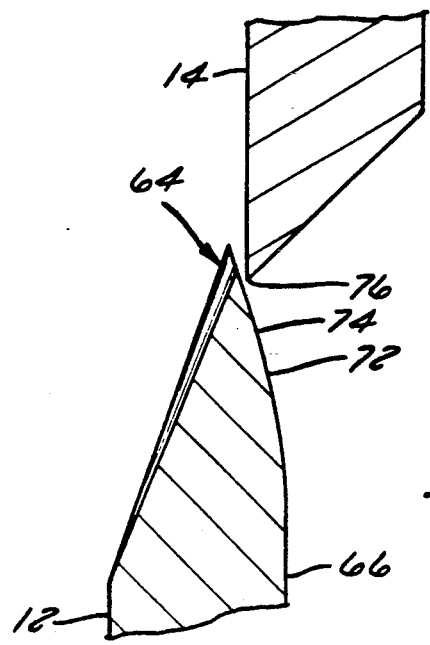
FIG. 5
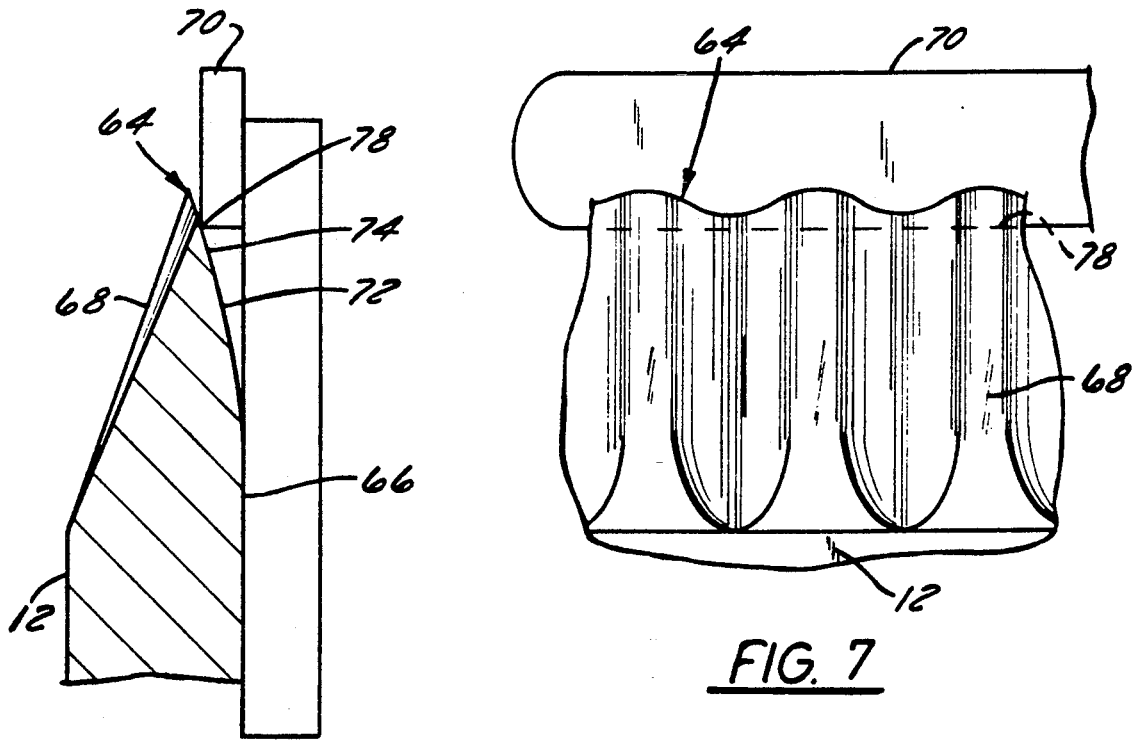
FIG. 6
FIG. 7

SERRATED SHEARS

FIELD OF THE INVENTION

The present invention relates to hedge shears, and more particularly to a compound action head shears having a serrated cutting edge on one of the blades.

BACKGROUND OF THE INVENTION

A compound action shears of the type contemplated herein is shown and described in U.S. Pat. No. 3,187,430, entitled "Shears" which issued on Jun. 8, 1965, to E. M. Wallace, et al. This shears included upper and lower blades pivotally interconnected at their respective rearward portions and being operative in a horizontal plane in combination with upper and lower handles pivotally interconnected at their respective forward portions independent of and forwardly of the point of pivotal interconnection of the blades, and a pintle fixed to each blade and pivotally engaged with the forwardly projecting portion of the handle pivot so that an increased horizontal leverage is exerted intermediate the ends of the cutting blades and simultaneously a transverse force is exerted to increase contact pressure between the blades. The blades are interconnected to provide a trio of force generating pivots bringing the blades together forwardly of the blade pivot. One of the generating pins being in the form of the handle pivot for creating the normal transverse force resulting in creating a normal contacting pressure between the cutting edges.

E. M. Wallace, et al. recognized that as the included angle between the cutting edges increased, the work tends to be thrown or forced out from the blades and that serrated edges on one or both of the blades could be provided with the purpose of offsetting the forces tending to throw the work out from the blade. However, serrating the blades did not solve the problem, since there was only one cutting edge and thus only one cutting blade for severing the work. The cutting edge of the cutting blade also intersecting the edge of the serrated edge of the other blade intermittently causing excessive wear to the serrated edge.

SUMMARY OF THE PRESENT INVENTION

The compound action shears according to the present invention includes a serrated cutting edge at the intersection of the inner face with the edge face of one of the blades. The inner face being beveled at the intersection with the edge face to provide a cutting surface spaced inwardly with respect to the serrated cutting edge of the blade. With this arrangement, the cutting edge of the other blade engages the beveled surface below the serrated edge to provide a smooth interface without engagement between the cutting edge and the serrated edge. The serrated cutting edge is thereby provided with a longer life. The serrated cutting edge also is capable of preventing the throwing or forcing out tendency of the blades as they are closed on the work.

Other principal features and advantages of the invention will become apparent to those skilled in the art upon review of the following drawings, the detailed description and the appended claims.

BRIEF DESCRIPTION OF THE DRAWINGS

FIG. 1 is a plan view of a compound shears as contemplated by the present invention;

FIG. 2 is a partial view of the compound shears in an opened position;

FIG. 3 is a view taken along line 3—3 of FIG. 2 showing the midsection of the compound shears;

FIG. 4 is a view taken on line 4—4 of FIG. 1 showing a perspective view of the serrated blade;

FIG. 5 is a cross section of a portion of the blades showing the point of cutting contact;

FIG. 6 is a view showing a feeler gauge positioned at the point of contact of the cutting edge with respect to the serrated edge of the cutting blade; and FIG. 7 is a view of the serrated blade with the feeler gauge positioned at the line of contact of the cutting blade with the serrated blade.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The compound action shears 10 of the type contemplated herein includes a pair of cutting blades, 12, 14, one of the blades constituting the upper blade 12 and the other of the blades constituting the lower blade 14. The upper blade 12 is provided with a serrated edge as shown in FIG. 4. The upper and lower blades are pivotally interconnected adjacent their rearward extremities by a blade pivot 16 comprising a cylindrical stud having opposite end portions 18, 20 on each side of a radial flange 22 at the midsection of the end portions. One end portion 18 of the blade pivot is receivable in an opening 24 through the blade 12 and the other end portion 20 is receivable in an opening 26 extending through the other blade 14. The flange 22 is interposed between the blades 12, 14 for separating the rearward extremities of the blades to provide positive engagement of the cutting blade 14 with serrated blade 12 as is generally shown in the prior art.

A handle receiving member 28, 30 is provided at one end of each blade 12, 14, respectively. The members 28, 30 are adapted to receive handles 32, 34 which are designated as an upper handle and a lower handle. A handle pivot 36 is provided forwardly of the pivotable connection of the cutting blades in the form of a bolt 38 extendable through aligned openings 40, 42 in the handle receiving members 28, 30 and in a loose fitting manner through oppositely facing aligned registering openings 44, 46 in blades 12 and 14, respectively. A nut 48 is threadedly received on the bolt 38 to pivotally interconnect the handle receiving members 28, 30. A cup washer 50 may be disposed between the head 52 of bolt 38 and the upper planar surface of handle receiving member 28. Washers 52 and 54 may be interposed between the handle receiving members 28 and 30 and their respective blades 12 and 14, as shown.

The handle receiving members 28 and 30 are offset so as to facilitate the asymmetry of the construction and to allow the disposition of grasping handles 32 and 34 in a single, generally horizontal plane. Each handle receiving member 28, 30 is a counterpart of the other, except that the shanks are bent in opposite directions so that when the shears are assembled, the grasping handles extend outwardly in the same plane from the median line of the shears in opposite directions.

Blade 12 has a pivot or pintle pin 55 which may be secured thereto by any suitable means so as to allow an upward extremity to extend upwardly from the outer planar surface thereof. The upper extremity being pivotally receivable in an appropriately aligned vertically disposed opening 56 extending through the handle receiving member 28.

Blade 14 has near its cutting edge and forwardly of the handle pivot a pin 58 which may be secured thereto by any suitable means so as to allow a lower extremity to extend downwardly from the outer planar surface thereof. The lower extremity being pivotally receivable in an appropriately aligned opening 60 extending through handle receiving member 30 adjacent the forwardmost extremities thereof.

Referring to FIGS. 5, 6 and 7, a portion of the blade 12 is shown having a serrated cutting edge 64 at the intersection of the inner face 66 with the edge face 68. A feeler gauge 70 is shown located in abutting relation to the inner face 66 of blade 12. The inner face 66 is beveled outwardly at 72 toward the serrated edge 64 to provide a contact surface 74 which is 0.010 inches wide ±0.005. Contact between the cutting edge 76 of blade 14 will occur inwardly of the serrated edge 64 on a theoretical line 78. It should be noted that the line 78 is located inwardly of the serrated edge 64 a distance sufficient to ensure that there will be no contact between the cutting edge 76 of blade 14 and the serrated edge 64 of blade 12.

Thus, it should be apparent that there has been provided in accordance with the present invention an improved serrated shears that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. In a compound action shears, including a pair of blades having cutting edges and a floating blade pivot pivotally interconnecting the blades at their respective rearward portions, a pair of handle levers pivotally connected by means of a handle pivot forwardly of the floating blade pivot, the handle pivot being pivotally extendable through openings in the blades and a pair of pivot pins connecting said handle levers to the blades forwardly of the blade pivot, the improvement comprising:
   a serrated cutting edge on one of said blades, the inner surface of said one of said blades being beveled to provide a curved surface rearwardly of said serrated cutting edge for engagement with the cutting edge of the other of said blades.

2. A shear type cutting tool comprising a pair of shearing blades interconnected for reciprocation between an open and a closed position, each one of said blades having an inner face and an edge face, the intersection of which defines a cutting edge, the inner face being that face of a respective one of said blades lying closest to the inner face of the other blade during the closed state of said reciprocating shearing blades, the edge face of one of said blades being grooved to form a serrated cutting edge at the intersection of the inner face with the edge face, the inner face being beveled away from the inner face of the other blade whereby the cutting edge of said other blade engages the beveled surface of the other blade on a line inwardly from the serrated cutting edge.

3. In a hedge shears having an upper blade and a lower blade being operative in a common plane and having cooperating contacting cutting edges,
   a floating pivot extendable in a plane transverse to the plane of said blades and interposed between and pivotally interconnecting the rearward portion of the upper and lower blades,
   an upper handle having a handle extension and a forwardly projecting portion,
   a lower handle having a handle extension and a forwardly projecting portion,
   a handle pivot independent of and forwardly of said blade pivot and pivotally extendable through aligned openings in said upper and lower blades in a plane transverse to the plain of said blades and constituting the pivoted interconnection between the upper and lower handle levers,
   a pair of pintles each interconnecting one of the pair of blades to the forwardly projecting portion of one of the handle levers,
   the improvement comprising:
   a serrated cutting edge on the upper of said blades and a cutting edge on the lower of said blades,
   the inner face of the upper of said blades being tapered at the serrated cutting edge whereby said cutting edge of said lower of said blades engages the inner face of the upper of said blade on a line spaced from said serrated cutting edge.

* * * * *